US012274899B2

(12) United States Patent
Safe et al.

(10) Patent No.: US 12,274,899 B2
(45) Date of Patent: Apr. 15, 2025

(54) SAFETY HARNESS WITH REMOVABLE RIGID DORSAL FORCE-TRANSFER MEMBER

(71) Applicant: 3M INNOVATIVE PROPERTIES COMPANY, St. Paul, MN (US)

(72) Inventors: Nathan W. Safe, Red Wing, MN (US); Stephen D. Shaver, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 943 days.

(21) Appl. No.: 17/420,035

(22) PCT Filed: Jan. 14, 2020

(86) PCT No.: PCT/IB2020/050277
§ 371 (c)(1),
(2) Date: Jun. 30, 2021

(87) PCT Pub. No.: WO2020/148655
PCT Pub. Date: Jul. 23, 2020

(65) Prior Publication Data

US 2022/0080233 A1 Mar. 17, 2022

Related U.S. Application Data

(60) Provisional application No. 62/793,163, filed on Jan. 16, 2019.

(51) Int. Cl.
*A62B 35/00* (2006.01)

(52) U.S. Cl.
CPC ...... *A62B 35/0018* (2013.01); *A62B 35/0037* (2013.01)

(58) Field of Classification Search
CPC ........................ A62B 35/0018; A62B 35/0037
See application file for complete search history.

(56) References Cited

U.S. PATENT DOCUMENTS

| | | | |
|---|---|---|---|
| 6,179,188 | B1 | 1/2001 | Gleason |
| 6,405,728 | B1 | 6/2002 | Van Hall |
| 6,971,476 | B2 | 12/2005 | Wolner |

(Continued)

FOREIGN PATENT DOCUMENTS

WO WO 2019-012468 1/2019

OTHER PUBLICATIONS

"3M™ DBI-SALA® Fall Protection", Full Line Catalogue, 2017, pp. 1-105.

(Continued)

*Primary Examiner* — Rodney Mintz
(74) *Attorney, Agent, or Firm* — Kenneth B. Wood

(57) ABSTRACT

A safety harness including first and second shoulder straps and a waist strap and a rigid dorsal force-transfer member with an upper end that is removably connected to the first and second shoulder straps at a dorsal crossing point of the first and second shoulder straps and with a lower end that is removably connected to a dorsal portion of the waist strap. Methods of removably equipping a safety harness with a rigid dorsal force-transfer member, and of removing a rigid dorsal force-transfer member from a safety harness.

20 Claims, 14 Drawing Sheets

(56) References Cited

U.S. PATENT DOCUMENTS

| | | | | |
|---|---|---|---|---|
| 8,182,439 | B2 * | 5/2012 | Glenn | F41H 1/02 84/421 |
| 8,356,604 | B2 * | 1/2013 | Tweardy | A61F 5/055 602/17 |
| 8,701,674 | B2 | 4/2014 | Tweardy | |
| 8,714,424 | B2 * | 5/2014 | Oddou | A45F 3/04 224/637 |
| 8,959,664 | B2 | 2/2015 | Johnson | |
| 9,174,073 | B2 | 11/2015 | Casebolt | |
| 9,427,608 | B2 * | 8/2016 | Fink | A62B 35/0075 |
| 9,629,443 | B2 * | 4/2017 | Searle | A45F 3/10 |
| 9,918,540 | B2 * | 3/2018 | Fawcett | F16M 13/04 |
| 10,137,322 | B2 * | 11/2018 | Perner | A62B 35/0006 |
| 10,232,199 | B2 | 3/2019 | Perner | |
| 10,561,866 | B1 | 2/2020 | Hinnant | |
| 11,191,325 | B2 * | 12/2021 | Hetrich | A44B 11/28 |
| 11,369,816 | B2 * | 6/2022 | Carrasca | A62B 35/0037 |
| 2005/0067221 | A1 | 3/2005 | Wolner | |
| 2006/0102423 | A1 | 5/2006 | Lang | |
| 2010/0076359 | A1 | 3/2010 | Glenn | |
| 2010/0200329 | A1 * | 8/2010 | Johnson | A62B 35/0025 182/3 |
| 2010/0243694 | A1 * | 9/2010 | Oddou | A45F 3/04 224/633 |
| 2011/0017546 | A1 | 1/2011 | Nichols, Jr. | |
| 2011/0114101 | A1 * | 5/2011 | Tweardy | A61F 5/055 128/870 |
| 2011/0118639 | A1 * | 5/2011 | Tweardy | A61F 5/055 602/18 |
| 2014/0224580 | A1 * | 8/2014 | Casebolt | F16F 7/006 188/376 |
| 2014/0331459 | A1 | 11/2014 | Fink | |
| 2015/0048134 | A1 | 2/2015 | Fawcett | |
| 2016/0022018 | A1 | 1/2016 | Searle | |
| 2016/0089554 | A1 | 3/2016 | Perner | |
| 2016/0361577 | A1 * | 12/2016 | Perner | A62B 35/0037 |
| 2019/0313746 | A1 | 10/2019 | Hetrich | |
| 2019/0329077 | A1 | 10/2019 | Carrasca | |
| 2022/0355134 | A1 * | 11/2022 | McLeod | A62B 35/0018 |
| 2023/0320463 | A1 * | 10/2023 | Weiss | A44B 11/2519 182/3 |
| 2025/0009114 | A1 * | 1/2025 | Thoms | A62B 35/0025 |

OTHER PUBLICATIONS

"Exofit Strata", 3M™ DBI-SALA®, Product Brochure, 2015, pp. 1-8.

"Exofit Strata", Full Body Harness, User Instructions Manual, 2015, pp. 1-15.

"Nano-Lok Self Retracting Lifelines", 3M™ DBI-SALA® Fall Protection, Instruction Manual, 2017, pp. 1-24.

International Search Report for PCT International Application No. PCT/IB2020/050277, mailed on Apr. 23, 2020, 4 pages.

* cited by examiner

SAFETY HARNESS WITH REMOVABLE RIGID DORSAL FORCE-TRANSFER MEMBER

BACKGROUND

Safety harnesses are often used to reduce the likelihood of a user experiencing a fall, and/or to safely arrest the user in the event of a fall. Such harnesses are often used in combination with one or more of a self-retracting lifeline (e.g., a personal self-retracting lifeline), an energy-absorbing lanyard, and other fall-protection equipment.

SUMMARY

In broad summary, herein is disclosed a safety harness comprising first and second shoulder straps and a waist strap and a rigid dorsal force-transfer member with an upper end that is removably connected to the first and second shoulder straps at a dorsal crossing point of the first and second shoulder straps and with a lower end that is removably connected to a dorsal portion of the waist strap. Also disclosed are methods of removably equipping a safety harness with a rigid dorsal force-transfer member and of removing a rigid dorsal force-transfer member from a safety harness. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
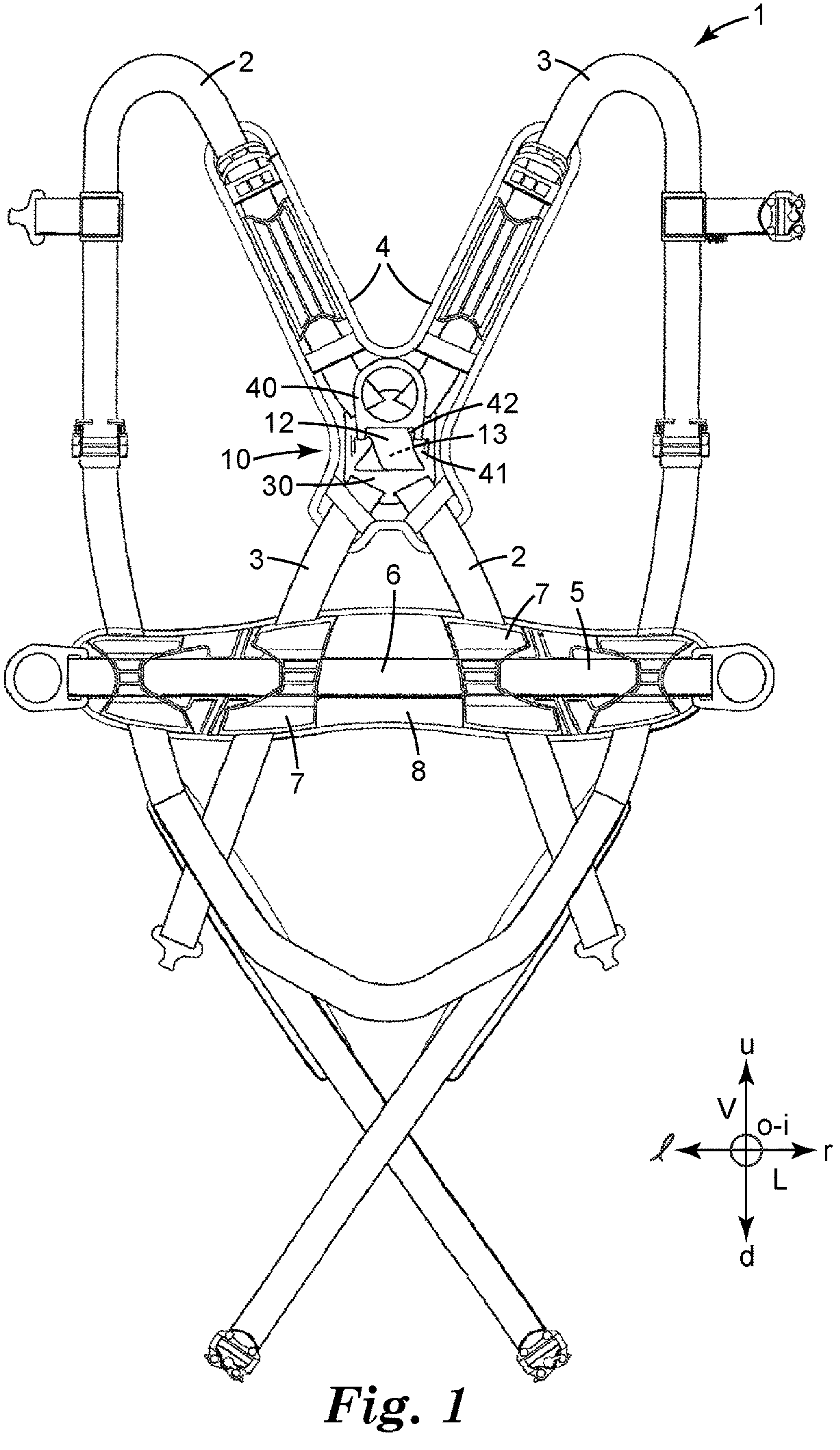
FIG. 1 is a rear view in generic representation of an exemplary fall-protection safety harness with which a rigid dorsal force-transfer member as disclosed herein may be used.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted.

The following terminology is defined with respect to a fall-protection safety harness as worn by a user standing upright, when viewed from behind the user:

Terms such as vertical, upward and downward, above, and below, and so on, correspond to directions that are at least generally parallel to the sagittal plane and the coronal plane of a user wearing the harness. The vertical axis (V), and upward (u) and downward (d) directions along the vertical axis, are denoted in various Figures. The vertical axis will often correspond to the "vertical" direction with respect to the Earth's gravity, e.g., when the harness is worn by a user who is standing upright.

The term inward denotes a direction that is generally perpendicular to the vertical axis and is toward the body of a user of the harness. The term outward denotes an opposing direction, away from the body of the user of the harness. The inward-outward directions (i) and (o) are denoted in various Figures, and will typically be parallel to the transverse plane of the user when standing upright. For a harness/user viewed from the rear, the inward and outward directions will respectively correspond to generally forward and rearward directions. By way of specific examples, the inward direction is into-plane, and the outward direction is out-of-plane, in FIGS. 1 and 2.

As used herein, the term lateral denotes a direction that is generally perpendicular to the vertical direction and runs in a direction parallel to the coronal plane of the user; i.e., a side-to-side direction. (The lateral direction will typically be parallel to the transverse plane of the user when standing upright.) The lateral axis (L), and left (l) and right (r) directions along the lateral axis, are denoted in various Figures.

The term "dorsal" has its usual meaning with regard to human anatomy, indicating the region in proximity to the back of a person, extending generally from the shoulders down to the lumber region.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 30 degrees. The term "substantially", unless otherwise specifically defined, means to a high degree of approximation (e.g., within +/−10% for quantifiable properties). For angular orientations, the term "substantially" means within clockwise or counterclockwise 10 degrees. The term "essentially" means to a very high degree of approximation (e.g., within plus or minus 2% for quantifiable properties; within plus or minus 2 degrees for angular orientations); it will be understood that the phrase "at least essentially" subsumes the specific case of an "exact" match. However, even an "exact" match, or any other characterization using terms such as e.g., same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter, particularly for the case of a parameter that is variable.

DETAILED DESCRIPTION

Fall-protection safety harnesses, some-times referred to as full-body safety harnesses, are widely used in circumstances in which workers are at elevated height or are otherwise at risk of falling A fall-protection safety harness is configured to serve in combination with a fall-protection device or apparatus such as, e.g., a self-retracting lifeline or horizontal lifeline, a lanyard or the like, to provide fall protection. Thus in ordinary use, at least one such fall-protection device is typically connected to the safety harness, e.g., to a D-ring (or other suitable attachment means such as a quick-connector) borne by the harness. Safety harnesses will be distinguished from, for example, general-use items such as backpacks and the like.

Figure 2:
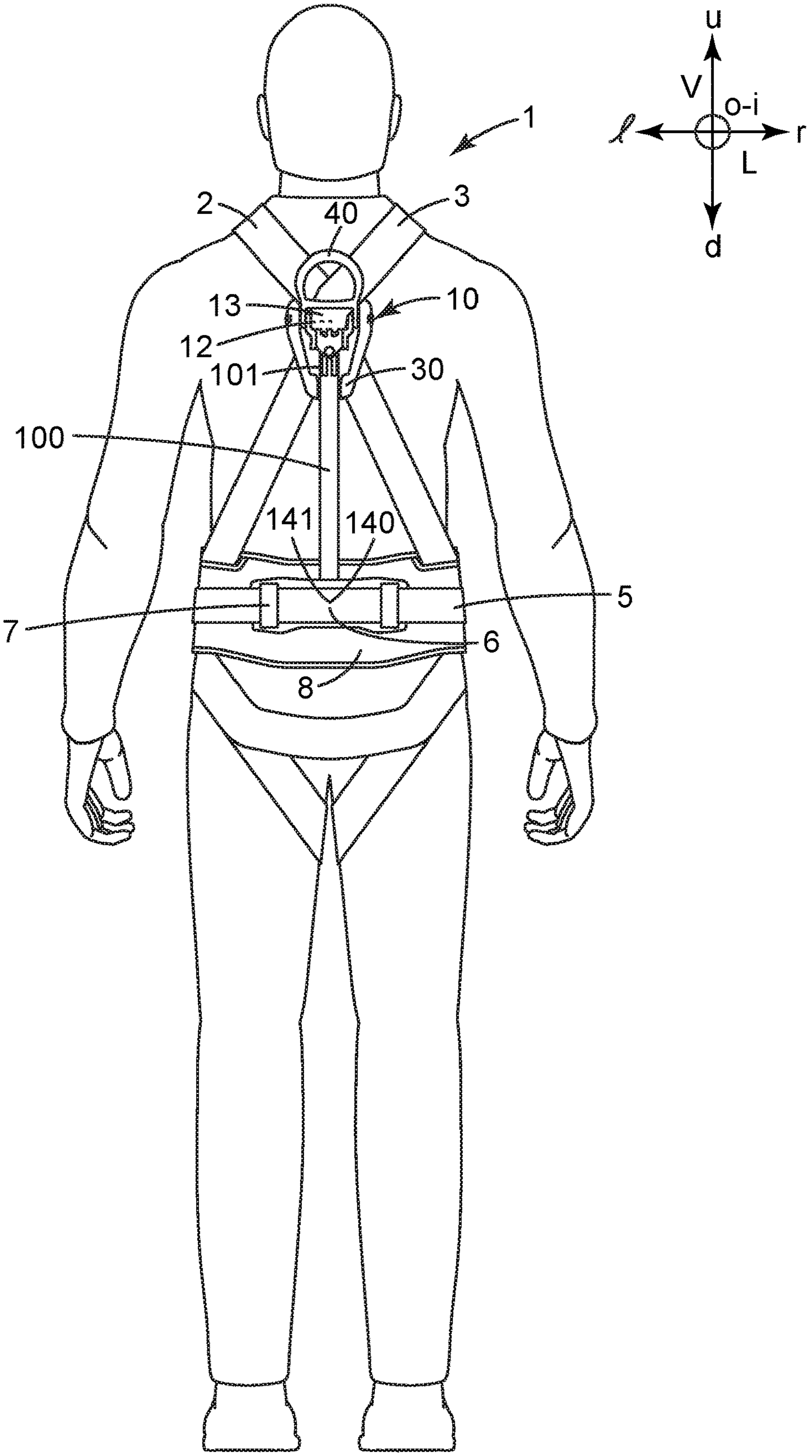
FIG. 2 is a rear view in generic representation of an exemplary fall-protection safety harness equipped with a rigid dorsal force-transfer member, as worn by a user.

As illustrated in generic representation in FIG. 1, a full-body fall-protection safety harness 1 will comprise first and second shoulder straps 2 and 3 that extend over the top of the shoulders as shown in FIG. 2. A harness 1 will also comprise a waist strap 5 that encircles the waist/hip area of the user. Such straps are often comprised of flat webbing, made of, e.g., woven synthetic fabric such as, e.g., polyamide, polyaramid (such as, e.g., Kevlar), ultra-high molecular weight polyethylene (such as, e.g., Dyneema) and the like. Such straps are typically flexible (e.g., so that they can conform to the surface of a wearer's body, can be passed through one or more of buckles, guides, loops and the like) but typically are not significantly extensible. As will be well understood, such straps (and other straps such as, e.g., leg or thigh straps as may be present) are interconnected with each other and are often fitted with various pads (e.g., shoulder pads 4 and waist/hip pad 8) to enhance the comfort of the harness, as well as various buckles, latches, connectors, loops, guides, additional pads such as, e.g., chest pads and/or leg pads, and so on. Such components and exemplary arrangements of such components are described in, for example, U.S. Pat. Nos. 8,959,664, 9,174,073, and 10137322, all of which are incorporated by reference in their entirety herein. It will be understood that the particular arrangements of FIGS. 1 and 2 are intended as exemplary representations; in actuality a safety harness may vary from the exact arrangements shown in these Figures.

In many safety harness designs, first and second shoulder straps 2 and 3 meet, overlap and cross each other at a dorsal crossing point 10 as indicated in FIGS. 1 and 2. Such a dorsal crossing point will be located generally toward the middle of the users back, e.g., between portions of the shoulder blades. The term point is used for convenience of description and does not require that the straps intersect at a single "point" in the mathematical sense. Rather, the first and second shoulder straps 2 and 3 will respectively comprise overlapping sections 12 and 13 that typically will be in at least partially overlapping relation for a macroscopic distance (e.g., for several cm) along their lengths. In some instances the straps may be guided so that the overlapping sections of the straps are at least generally parallel over a short distance, e.g., as they pass through various slots, guides, or the like. The dorsal area in which the shoulder straps are at least partially overlapped with each other (when viewed along the inward-outward direction) is referred to herein as the dorsal crossing point.

As illustrated in generic representation in FIG. 2, herein is disclosed the use of a rigid dorsal force-transfer member 100 with an upper end 101 that is removably connected to first and second shoulder straps 2 and 3 at their dorsal crossing point and with a lower end 140 that is removably connected to a dorsal portion 6 of waist strap 5. By "rigid" is meant that in ordinary use of harness 1 (e.g., as a user of the harness stands, walks, crouches, leans, etc.), force-transfer member 100 will remain in its original shape rather than deforming (e.g., bending) In various embodiments, rigid member 100 may be made of (or include an elongate beam of) a material with a Young's modulus of at least 1.0, 2.0, 4.0, 10, 20, or 50 GPa. In some embodiments, member 100 may comprise a resilient coating, padding, cushion, or the like that is applied to at least a portion of the surface of the member. However, member 100 must at least include an elongate beam of appropriate stiffness to provide the desired rigidity. Furthermore, member 100 must not be hinged or articulated in any such way that would allow it to deform or collapse rather than maintaining its original shape under a load. In various exemplary embodiments a force-transfer member 100 may comprise an elongate beam of metal such as steel or aluminum; or, a rigid polymeric material such as, e.g., glass-fiber or carbon-fiber reinforced polymer, coated or overmolded in various locations as desired with a soft, e.g., rubbery, material.

By a force-transfer member is meant that member 100 acts to transfer a portion of a load from shoulder straps 2 and 3 to waist strap 5. That is, a portion of a load that would otherwise be borne by the shoulder straps, is instead borne by the waist strap. By a dorsal force-transfer member is meant that such a load is transferred along the back of the wearer of the harness rather than along the front or lateral sides of the wearer. Such a load to be partially transferred may result from the weight of various items (e.g., one or more of hooks, self-retracting lifelines, D-rings, carabiners, fasteners, buckles, latches, tools, equipment, and so on), that are attached to or otherwise connected directly or indirectly to shoulder straps 2 and 3. Such items may be permanent components of the harness itself (e.g., buckles, latches, plates, pads, D-rings, etc.) or may be items that are removably attached to the harness (e.g., one or more self-retracting lifelines, lanyards, tool holders, and so on). In addition to one or more of the above-listed items, such items may include one or more of, e.g., side and/or front D-rings, carrying pockets, reflective layers, breathable linings, thermal insulation, impact indicators, labels, tool holders, lanyard keepers, wear pads, D-ring extensions, and hydration systems and water contained therein. In particular embodiments, some such items may be attached to a dorsal D-ring 40 of the harness, e.g., a D-ring of the general type depicted in FIGS. 1 and 2. (The terminology D-ring is used for convenience to denote an entity that provides an attachment point for attaching or connecting various items to the harness; this terminology does not limit the geometry, shape, or functioning of any such entity.)

From the above list of items it will be appreciated that the above-mentioned load that is to be partially transferred from the shoulder straps to the waist straps, may often result from the aggregate effect of components of the harness itself, e.g., along with items attached to the harness. Whatever the source of the load, force-transfer member 100 is configured so that in use of the harness, member 100 is loaded in compression so as to transfer a portion of this load from the shoulders of the user to the waist/hips of the user. That is, the direction of the force transfer is downward, e.g., at least generally along the vertical axis of the harness. Thus by definition, force-transfer member 100 is distinguished from any member or component that is configured to transfer a load in the opposite, upward direction (from the waist toward the shoulders). (Members configured to transfer a load upward, from the waist toward the shoulders, include for example the spinal support plate disclosed in U.S. Pat. No. 6,405,728.)

Force-transfer member 100 as disclosed herein can distribute loads more evenly and can enhance the comfort of a fall-protection safety harness, particularly if the harness is worn for an extended period of time. Moreover, as discussed in detail later herein, force-transfer member 100 is manually connectable to, and removable from, the harness rather than being permanently factory-installed. Thus if desired, member 100 can be manually installed (i.e., by hand, without any special tools or fixtures being required) as needed, can be removed when no longer needed, and can be reinstalled at a later time if desired.

Ordinary artisans are aware that fall-protection safety harnesses often include various plates that are relatively rigid (e.g., made of molded plastic and/or metal) and are thus distinguished from other, relatively flexible harness components such as straps, pads and cushions. For example, many harnesses include a dorsal plate 30 as shown in various exemplary configurations in FIGS. 1 and 2. Such dorsal plates are often used, e.g., to guide the shoulder straps, to support a dorsal pad, and/or to enhance the functioning of a dorsal D-ring 40.

In the present approach, the upper end of force-transfer member 100 is connected (directly or indirectly, as discussed in detail later herein) to the first and second shoulder straps, regardless of whether or not a dorsal plate is present. By definition, a force-transfer member whose upper end is connected (directly or indirectly) to the shoulder straps as disclosed herein, is distinguished from a force transfer member whose upper end is connected to a dedicated feature (e.g., receptacle) of a dorsal plate, which dedicated feature has the sole purpose of receiving the force-transfer member and does not directly interact in any manner with the shoulder straps. In other words, in the present arrangement, a load that is placed on the shoulder straps does not have to travel through any portion of a dorsal plate to reach the upper end of the force-transfer member to then be distributed toward the waist of the user. That is, even if a dorsal plate is present in the harness, the present approach does not require, or involve, using the dorsal plate itself as a significant part of the force-transfer pathway.

In many convenient embodiments, the lower end 140 of the force-transfer member 100 may be attached to a relatively rigid waist plate 7 that is provided, e.g., on at least a dorsal portion 6 of waist strap 5 as shown in exemplary embodiment in FIG. 2. The presence of such a waist plate may enhance the degree to which the force transmitted downward by member 100 can be distributed along waist strap 5. Such a waist plate 7 may be, e.g., mounted on waist strap 5 (e.g., waist strap 5 may pass through or along guides or slots provided in waist plate 7) permanently or removably, as will be readily understood. It will thus be understood that the concept of the lower end of a force-transfer member being connected to a waist strap, specifically includes circumstances in which the lower end of the member is attached to a waist plate that is itself mounted on the waist strap.

The lower end 140 of the force-transfer member is removably connected to the waist strap 5 (e.g., is removably connected to a waist plate that is mounted on the waist strap) thus facilitating the above-discussed ability to remove the member from the harness if desired. Moreover, the lower end of the force-transfer member can be connected to (and disconnected from) the waist strap manually, without any special tools or fixtures. The ability to manually attach the force-transfer member to both the shoulder straps and the waist strap provides that the force-transfer member can be installed by a user, e.g., in the field, if desired. Such arrangements are distinguished from those that require a force-transfer member to be factory-installed when a harness is manufactured and from those that require a harness to be returned to the factory or service center in order to retrofit the harness with a force-transfer member.

In many embodiments, lower end 140 of member 100 may be pivotally connected to a waist strap 5 by providing a pivotal connection between the lower end of the member and a waist plate that is (non-pivotally) mounted on the waist strap. This can allow member 100 to pivotally move (e.g., along a side-to-side direction generally aligned with the coronal plane of the user) through a desired angle. In various embodiments, such an angle may range from at least 5, 10 or 20 degrees to each side of the sagittal plane, up to at most 40, 30 or 25 degrees to each side of the sagittal plane. This can enhance the comfort of the harness, e.g., when the wearer is leaning to one side or the other, while still advantageously preserving the force-transmitting ability of the member. In some embodiments the connection between the lower end 140 of member 100 and a waist plate 7 may be a multi-axis connection (e.g., a ball- and socket connection) that allows not only some side-to-side pivotal movement of the member, but that may also allow at least a limited amount of pivotal movement of the member along the sagittal plane. This may further enhance the comfort of the harness, e.g., when the wearer is crouching, stooping or sitting.

In many convenient embodiments a force-transfer member 100 may be an elongate member that, when viewed along the inward-outward (forward-rearward) direction, is relatively straight and is oriented at least generally parallel to the sagittal plane of the wearer of the harness, along a majority, or all, of the elongate length of the member. In some particular embodiments such a member may be at least generally aligned with the sagittal plane of user, as in the exemplary design of FIG. 2. In many such embodiments such a member 100 may be connected to a waist plate 7 that is centered on the sagittal plane of the wearer of the harness, again as in the exemplary design of FIG. 2.

In some embodiments, member 100 may exhibit local deviations from such a linear geometry (in addition to such deviations that may be present in the form of mating features at the upper end of the member, to allow the member to be attached to the shoulder straps as discussed in detail later herein). For example, in some embodiments the lower portion of member 100 may be bifurcated (split), e.g., into a generally "Y"-shaped configuration (strictly speaking, a vertically inverted "Y") as it approaches the waist belt. Such arrangements may be used, for example, with a force-transfer member that connects to a waist plate that extends a large lateral distance along the dorsal/lumber region, or that connects to first and second waist plates that are laterally spaced so as to bracket the sagittal plane (waist plates 7 of this general type are visible in the exemplary harness of FIG. 1). Such arrangements are encompassed within the disclosures herein as long as the force-transfer member functions to transmit a load at least generally along a vertical direction toward the dorsal portion of a waist strap as described herein. Such arrangements are distinguished from those in which a member or other item is configured to transfer a load in a direction with a large lateral component, e.g., to only the sides of the hips of a user.

Of course, in many convenient embodiments (e.g., of the general type shown in FIG. 2) the force-transfer member will transfer the load downward in a vertical direction that is substantially parallel to, and aligned with, the sagittal plane of a user, except for such deviations as may occur when the user is leaning, bending, or the like. Even if such a member is generally, substantially, or essentially straight when viewed along the inward-outward direction, in many embodiments such a member may be curved when viewed along the lateral direction. For example, a force-transfer member may be bowed outward along a portion of its length, to generally follow the curvature of the wearer's back and/or to minimize contact of the member with the wearer's back.

As disclosed herein, the upper end of force-transfer member 100 is "connected to" the first and second shoulder straps 2 and 3. By this is meant that at the dorsal crossing point 10 of the shoulder straps, portions of the overlapped sections 12 and 13 of the shoulder straps pass outward of a base of the upper end of the force-transfer member and then pass through a bounded slot of the force-transfer member; or, that the portions of the overlapped sections pass outward of a base of a quick-connector to which the upper end of the force transfer member is removably connected and then pass through a bounded slot of the quick-connector. The first arrangement will be referred to as one in which the force-transfer member is "directly" connected to the straps; the second arrangement (using a quick-connector) will be referred to as one in which the force-transfer member is "indirectly" connected to the straps. Both arrangements and variations thereof are described in detail later herein. Regardless of the specific configuration, all such arrangements are distinguished from arrangements in which a force-transfer member is connected to a dedicated feature of a dorsal plate, as noted earlier herein.

Figure 3:
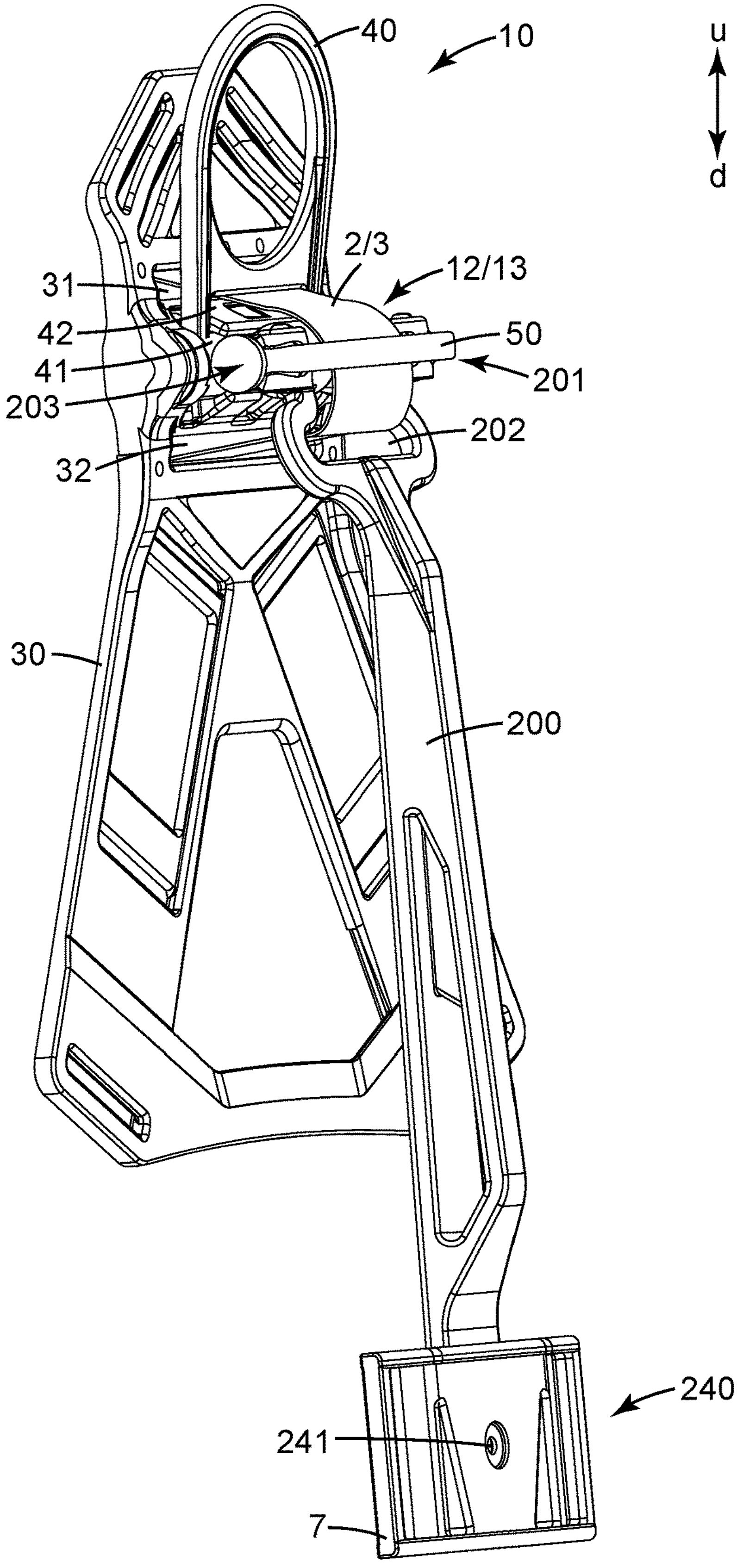
FIG. 3 is a side-rear perspective view of an exemplary rigid dorsal force-transfer member and associated items.

An arrangement of the first type (direct connection, not using a quick-connector) is shown in various aspects in FIGS. 3-6. For ease of presentation, various portions of the harness are omitted from these Figures. Moreover, although in actuality first and second, overlapped shoulder straps 2 and 3 will be present, for ease of presentation only a section of a single representative strap (labeled 2/3) is shown in FIG. 3. In these Figures, a rigid dorsal force-transfer member (designated 200) is shown that has an upper end 201 that is directly connected to shoulder straps 2/3. Thus in the exemplary design of FIGS. 3-4, at the dorsal crossing point 10, overlapping sections of shoulder straps 2/3 are routed to pass outward (rearward) of a base 203 provided at upper end 201 of member 200. The overlapping sections of the shoulder straps then pass inward (forward) through a bounded slot 202 in the upper end 201 of member 200. In other words, the shoulder straps are routed outward so as to partially wrap around the base 203 of member 200, then return inward through the bounded slot 202. This routing can be most easily seen in the side (lateral) view of FIG. 4.

Figure 4:
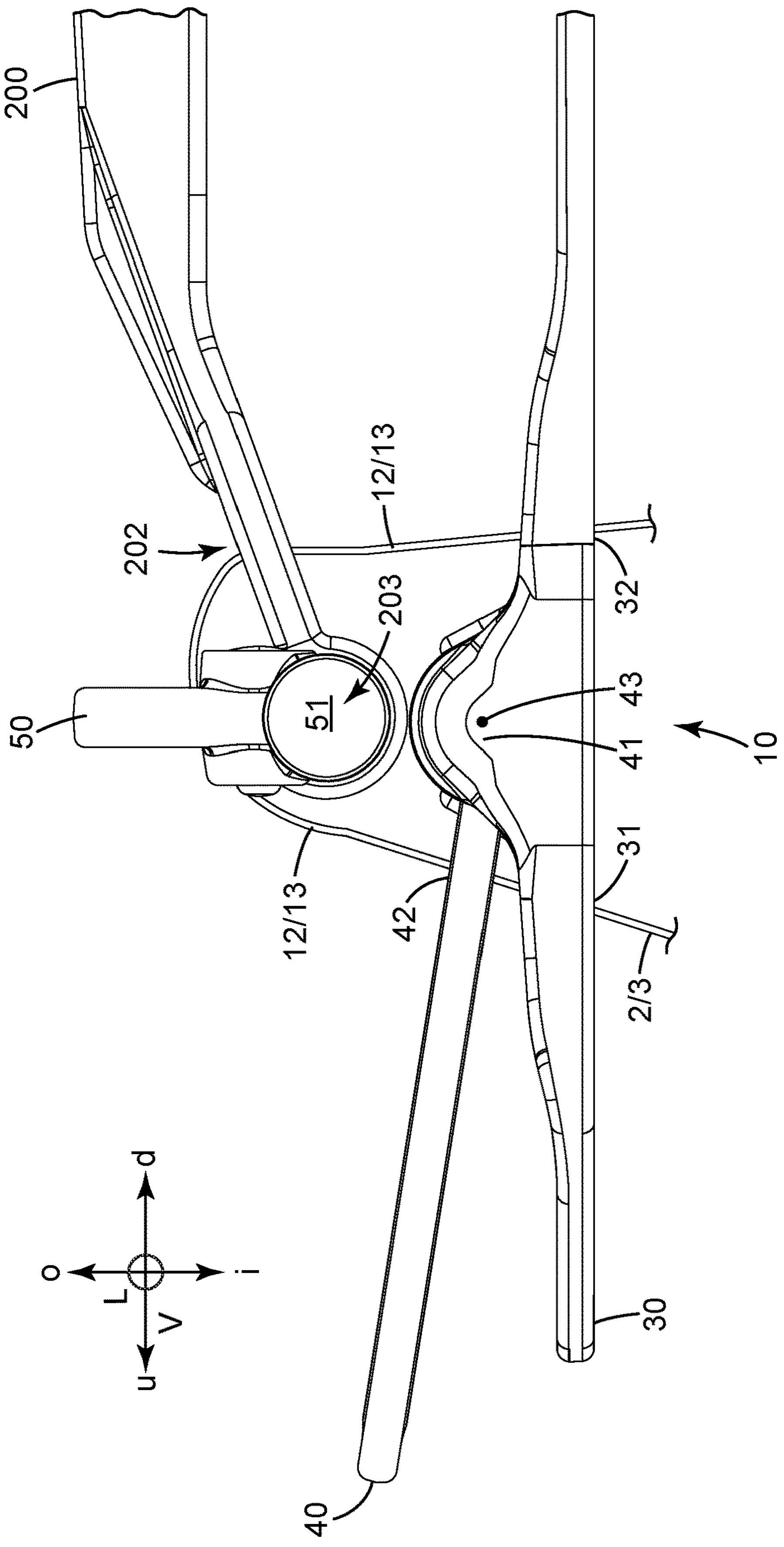
FIG. 4 is a side view, looking along the lateral direction, of the force-transfer member and other items of FIG. 3.

In the exemplary design of FIGS. 3 and 4, the harness includes a D-ring 40 and a dorsal plate 30, with the base 41 of the D-ring being pivotally connected to the dorsal plate so as to exhibit an axis of rotation 43 about which the D-ring can be pivotally moved generally upward and downward relative to the dorsal plate and to the harness as a whole. In the depicted embodiment, the shoulder straps 2 and 3 are routed outwardly through an upper slot 31 provided in the dorsal plate 30 and continue outward through a slot 42 provided in D-ring 40 near its base. The shoulder straps then pass outwardly around base 203 of the force-transfer member 200 and then pass inwardly through the bounded slot 202 of the force-transfer member, after which they pass inwardly through a lower slot 32 provided in dorsal plate 30. These arrangements (which of course could be described in reverse order) are easily seen in FIGS. 3 and 4.

Figure 5:
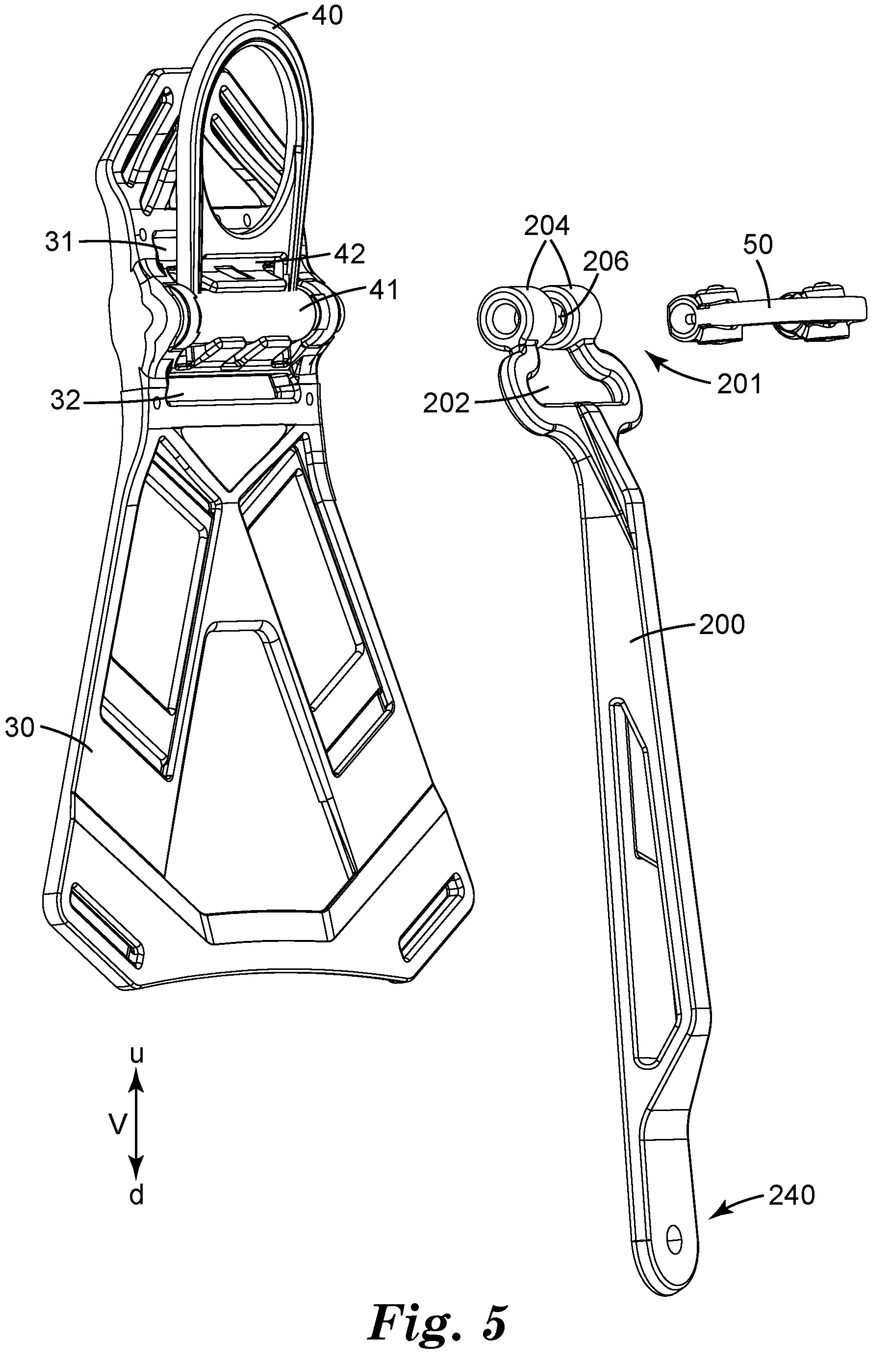
FIG. 5 is a side-rear partially exploded perspective view of the force-transfer member and other items of FIG. 3.
Figure 6:
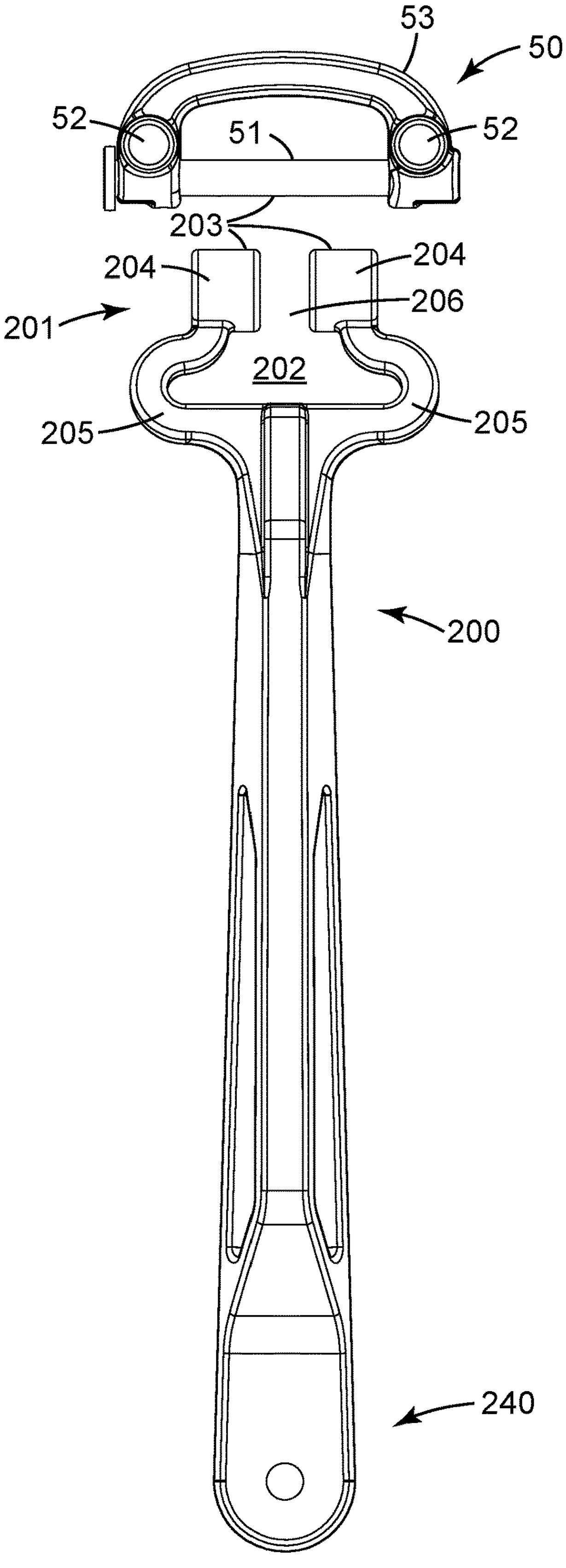
FIG. 6 is a rear view of the force-transfer member and fastener of FIG. 3.

Further details of this exemplary type of force-transfer member 200, and of an exemplary fastener 50 that can be used to reversibly fasten the upper end 201 of member 200 in place at dorsal crossing point 10, are shown in the isolated, partially exploded views of FIGS. 5 and 6. In the depicted embodiment, the upper end 201 of member 200 comprises sidearms 205 that partially define a slot 202. Each sidearm ends in an apertured sleeve 204, the sleeves 204 being laterally-spaced to define an access gap (opening) 206 therebetween as most easily seen in FIG. 6. Access gap 206 allows the overlapping sections 12 and 13 of the shoulder straps to be manually manipulated (inserted) through gap 206 and into slot 202. After this, a fastener 50 can be installed onto apertured sleeves 204, with a portion of elongate closure pin 51 of fastener 50 filling the former gap 206 so that slot 202 is now a bounded slot (meaning that the slot is bounded/unbroken on all (four) sides so that the straps cannot be removed through any side of the slot). In this embodiment the "base" 203 of the upper end 201 of the force-transfer member 200 is provided by the sleeves 204 of member 200 in combination with the portion of the closure pin 51 that fills the (former) gap 206 between the sleeves.

Fastener 50 may be of any suitable design. In many convenient embodiments, fastener 50 may comprise a main body 53 with an elongate closure pin 51 that is slidably movable relative to the main body, and with one or more actuators (e.g., spring-biased buttons 52 as more easily seen in the detailed view of a fastener 50 in FIGS. 10A and 10B) that allow the closure pin to be slidably moved. With the pin retracted, the ends of the main body of the fastener may be aligned with the apertured sleeves 204 of the force transfer member, after which the closure pin 51 may be slidably moved into place to close and lock the fastener. (Fasteners of this general type are sometimes referred to as harness interface connectors.) The result will be a configuration of the type shown in FIG. 3. It will be noted however that many other types of fastening schemes and arrangements may be used, as explored later herein.

If a safety harness is to be fitted with a force-transfer member of this general type, the portions of overlapping sections 12 and 13 of straps 2 and 3 that pass outward from dorsal plate 30 and from the base of D-ring 40 can be manipulated (e.g., loosened) so that they protrude (bulge) further outward. The force-transfer member can be then placed in position and the overlapping portions of the straps threaded through access gap 206 and into slot 202, after which fastener 50 may be locked into place. The lower end of the force-transfer member can be removably connected to the waist strap (e.g., to a waist plate mounted on the waist strap), and the shoulder straps can be snugged tight as necessary. (The attachment of the upper end of the member to the shoulder straps and the lower end of the member to the waist strap can be performed in any desired order; the process can be reversed in order to remove the force-transfer member from the harness.)

The result of such an installation will be an arrangement in which the base 203 of the upper end 201 of the force-transfer member 200 is positioned outward from base 41 of D-ring 40, and outward from dorsal plate 30, as can easily be seen in the side (lateral) view of FIG. 4. Also as evident from FIG. 4, in the absence of straps 12/13 there is no item or items that would hold the base 203 of the force-transfer member 200 in place proximate D-ring 40 and dorsal plate 30. Thus, in such embodiments member 200 does not comprise (either directly or indirectly) a "hard" connection by way of rigid or semi-rigid components, to the D-ring or the base plate. Rather, member 200 comprises only a "soft" connection to such components, i.e., by way of the (flexible) shoulder straps. Furthermore, in such embodiments the base 203 of member 200 is positioned outward of, and does not coincide with or define in any way, the axis of rotation 43 of the D-ring.

It will be understood that the particular shape and geometry of D-ring 40 and dorsal plate 30 as shown in FIGS. 3-5, the positioning of the various strap guides that are visible in plate 30, and so on, are merely exemplary and that any suitable variation is envisioned. FIG. 3 also includes an exemplary waist plate 7 (which includes guides for receiving a waist strap (not shown) to which the waist plate can be mounted). The lower end 240 of force-transfer member 200 can be connected, e.g., pivotally connected, to waist plate 7 via any suitable connection 241. For example, the lower end 240 of member 200 may comprise a detent feature, e.g., a stud or post, or a cavity or aperture, that can engage with a complementary feature of waist plate 7 to removably connect lower end 240 to waist plate 7. Aligning these features in an inward-outward direction (and providing suitable clearance within waist plate 7) can allow this to be a pivotal connection about which member 200 can be pivotally moved in a direction generally parallel to the coronal plane of the user (e.g., side-to-side).

It will be appreciated that there are many way in which such a connection, e.g., a pivotal connection, may be achieved. Such arrangements, and in general the shape, size, and configuration of waist plate 7 and how it interacts with a waist strap, can be varied as desired. It is thus emphasized that the particular arrangements shown in FIGS. 3-6 are exemplary. For example, the lower end of member 200, and waist plate 7, may be provided with a ball-and-socket pivotal connection that allows multi-axis movement. This may allow member 200 to be pivotally moved about the connection 241, at least slightly forward and rearward in an inward-outward direction as well as from side to side in a lateral direction.

The exemplary arrangements described above involve the direct connection of the upper end of a force-transfer member to the shoulder straps. As presented in exemplary embodiment in FIGS. 7-10, in some embodiments the upper end of a force-transfer member (designated 300, in these Figures) can be connected to the shoulder straps indirectly, by way of a quick-connector 1000. In such arrangements, the quick-connector 1000 can itself be directly connected to the shoulder straps, e.g., in a similar manner as described above for the force-transfer member. That is, portions of overlapping sections of the shoulder belts can be routed to pass outward (rearward) of a base 1003 of the quick connector. The overlapping portions of the shoulder straps then pass inward (forward) through a bounded slot 1002 in the quick-connector. In other words, the shoulder straps can be routed forward so as to partially wrap around the base 1003 of quick-connector 1000, and then return rearward through the bounded slot 1002 of the quick-connector, to connect the quick-connector to the straps.

In some embodiments, a quick-connector may take the form of a single, integral piece, as in the exemplary designs of FIGS. 7-10. In such a design, the base 1003 is an integral part of the quick-connector and cannot be disassembled from the quick-connector, e.g., in order to insert the shoulder straps in slot 1002. Thus, in such embodiments, the quick-connector is factory-installed and is non-removably connected to the shoulder straps. In other embodiments, the base of the quick-connector could for example comprise a removable pin (e.g., a slidably removable pin of similar design as pin 51 of fastener 50) so that the quick-connector can be manually installed onto, and removed from, the shoulder straps (e.g., by a user in the field) as desired. However, in many convenient embodiments the quick-connector may be a permanent, factory-installed component of the safety harness.

Regardless of whether the quick-connector is permanently or removably installed on the shoulder straps, the quick-connector will allow the upper end 301 of a force-transfer member 300 to be removably connected to the quick-connector in a quick and easy manner, manually without the use of special tools or fixtures. It will be appreciated that such a connection may be established more easily than the above-described procedure of threading the shoulder straps through an access gap in the upper end of the force-transfer member. In such embodiments, the upper end 301 of the force-transfer member 300 will comprise at least one connecting feature 302; and, the quick-connector 1000 will comprise at least one connecting feature 1005 that is complementary to connecting feature 302 of the force-transfer member. That is, feature 302 of the force-transfer member and feature 1005 of the quick-connector can be mated to each other and (reversibly) fastened together.

Figure 7:
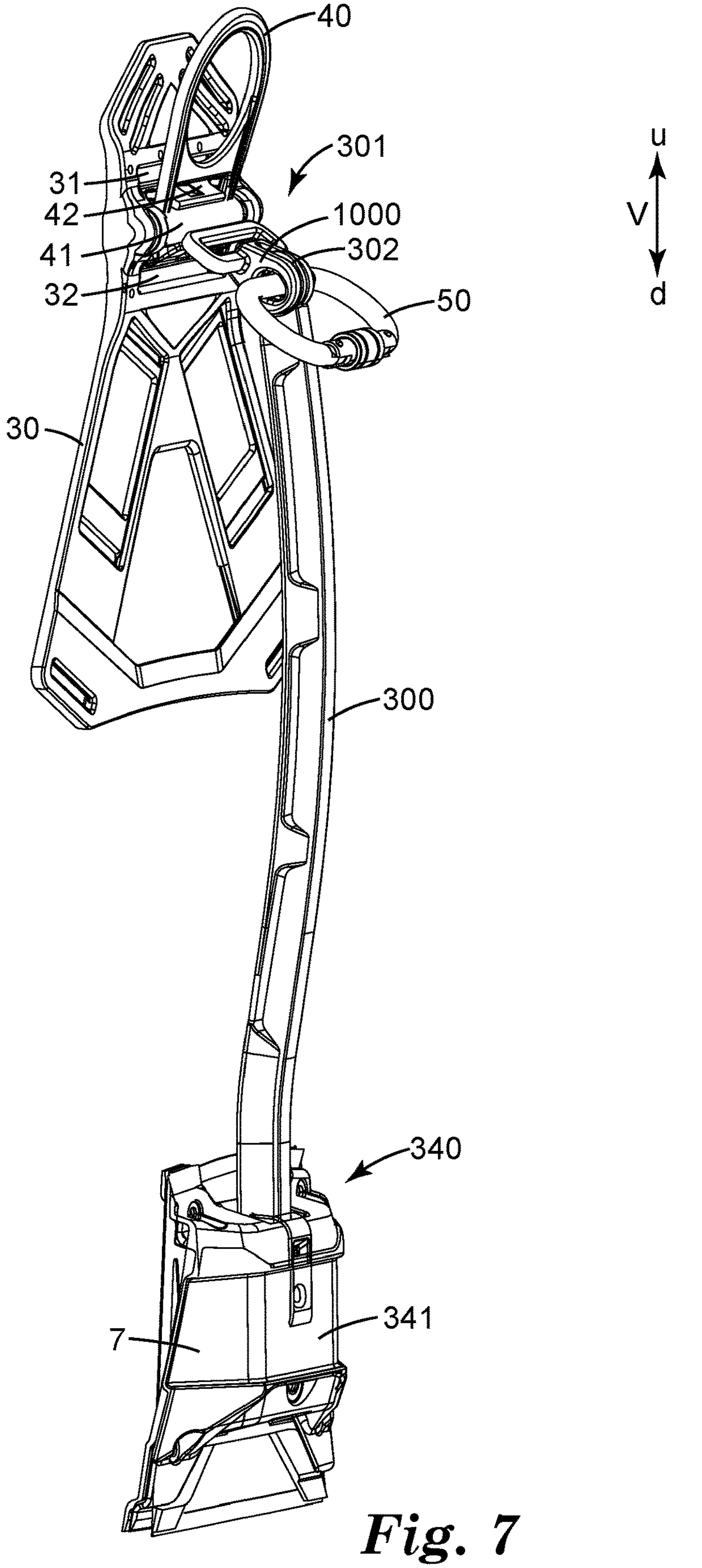
FIG. 7 is a side-rear perspective view of another exemplary rigid dorsal force-transfer member and associated items, including a single-axis quick-connector.
Figure 8:
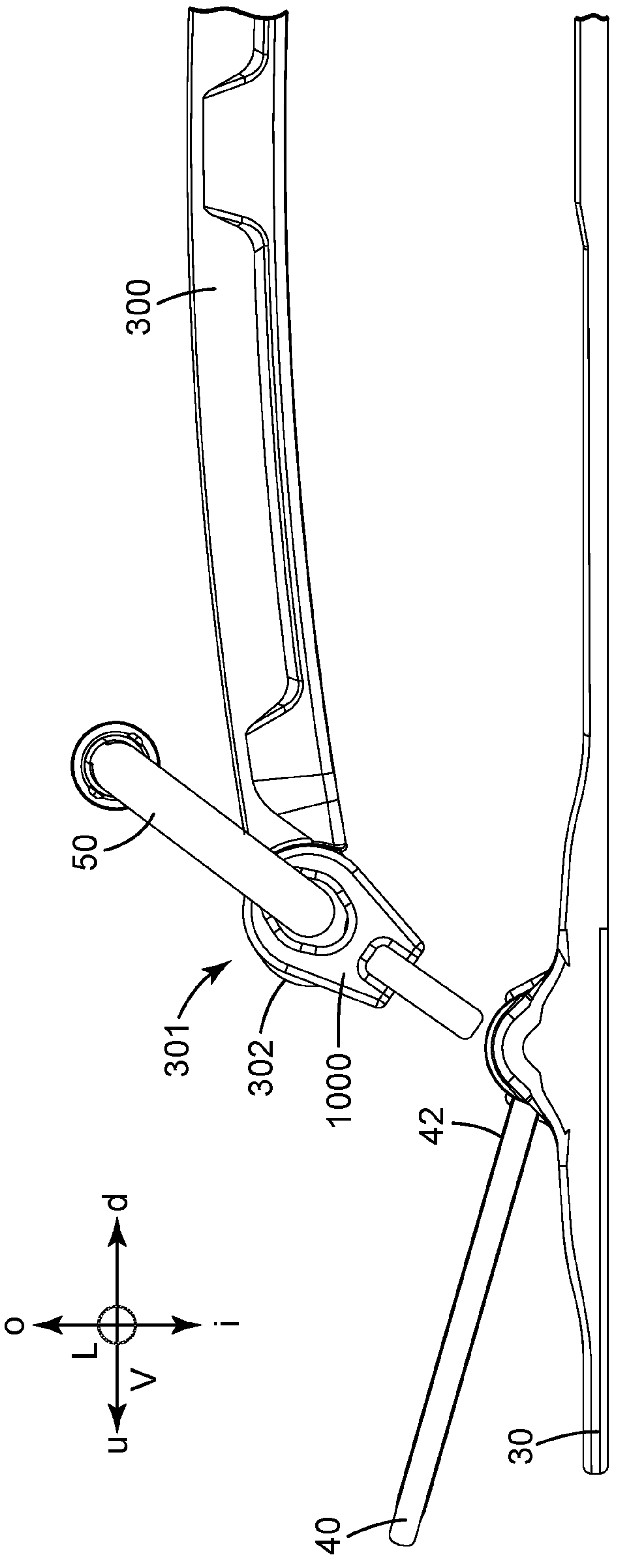
FIG. 8 is a side view, looking along the lateral direction, of the force-transfer member and other items of FIG. 7.
Figure 9:
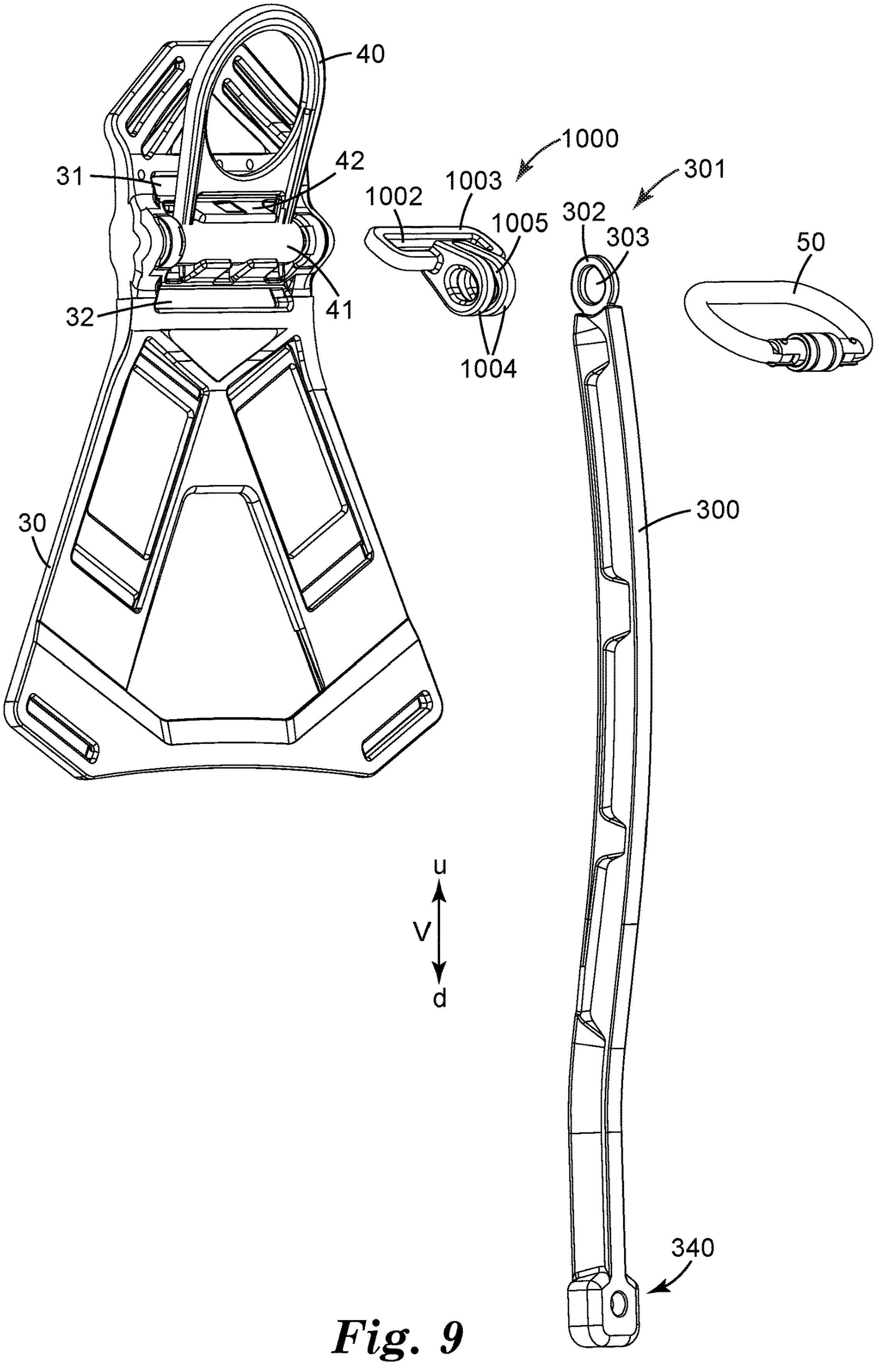
FIG. 9 is a side-rear partially exploded perspective view of the force-transfer member and other items of FIG. 7.
Figure 10A:
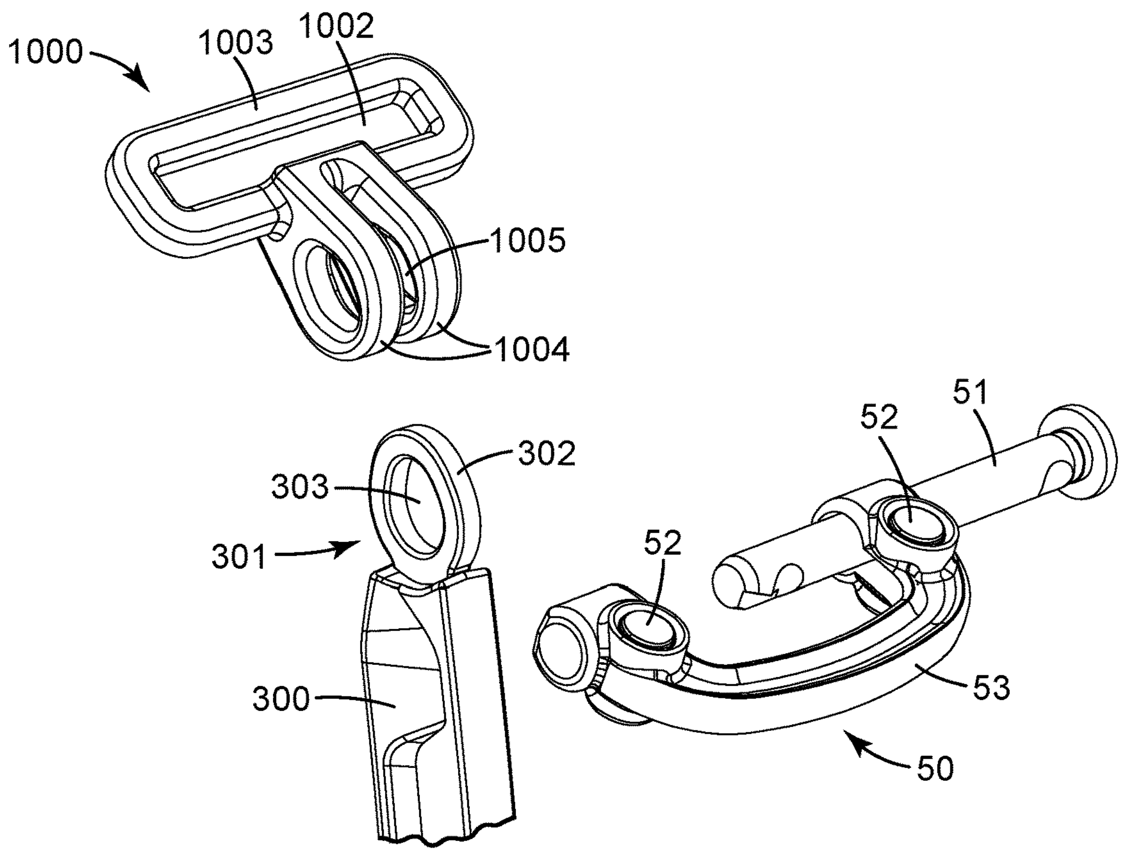
FIG. 10A is a perspective view of an upper end of an exemplary force-transfer member, a single-axis quick-connector, and a fastener that can be used to fasten the upper end of the force-transfer member to the quick-connector.
Figure 10B:
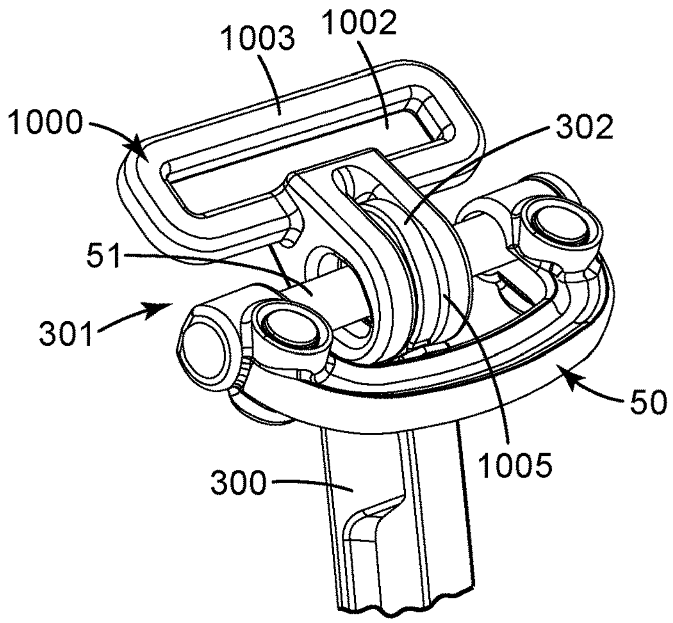
FIG. 10B is a perspective view of the force-transfer member of FIG. 10A, as fastened to the quick-connector.
Figure 11:
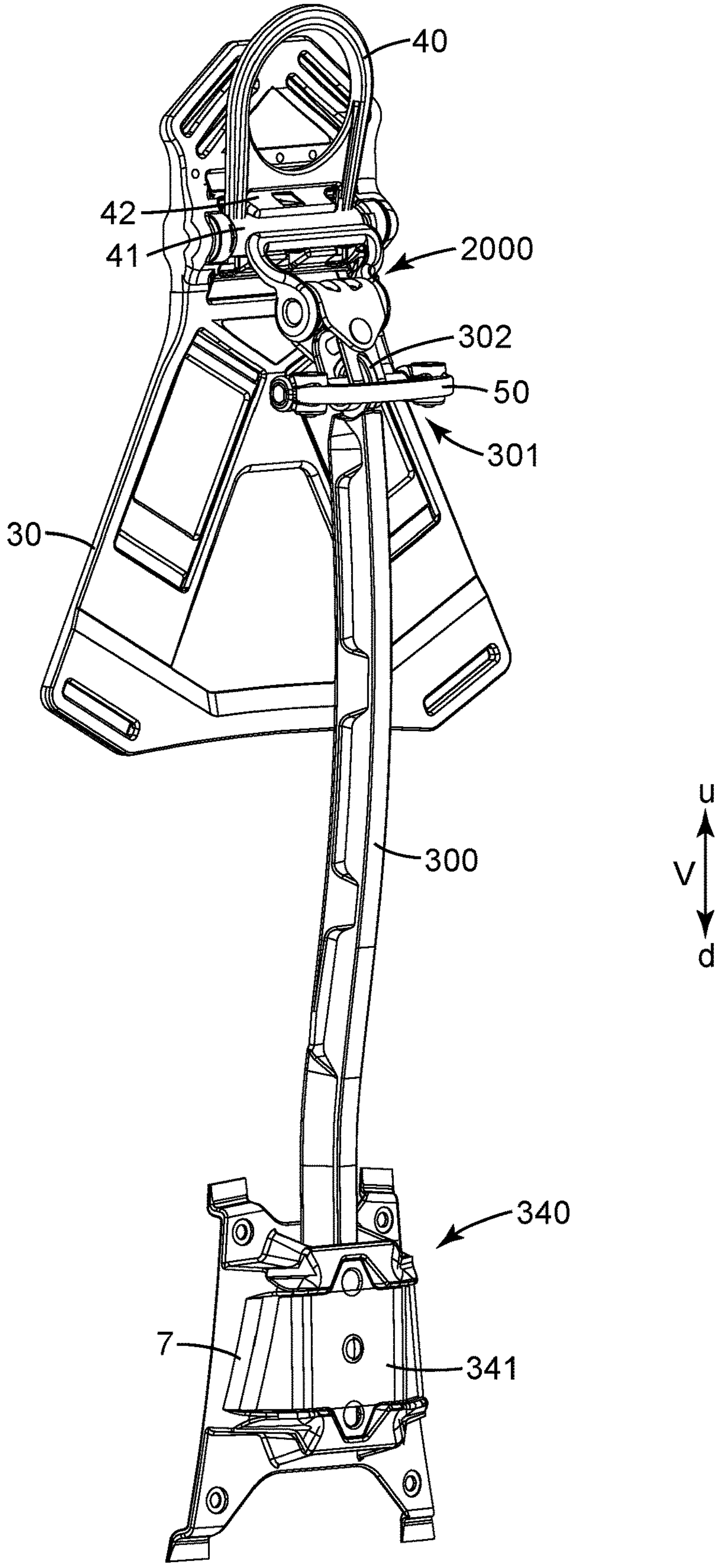
FIG. 11 is a side-rear perspective view of another exemplary rigid dorsal force-transfer member and associated items, including a multi-axis quick-connector.
Figure 12:
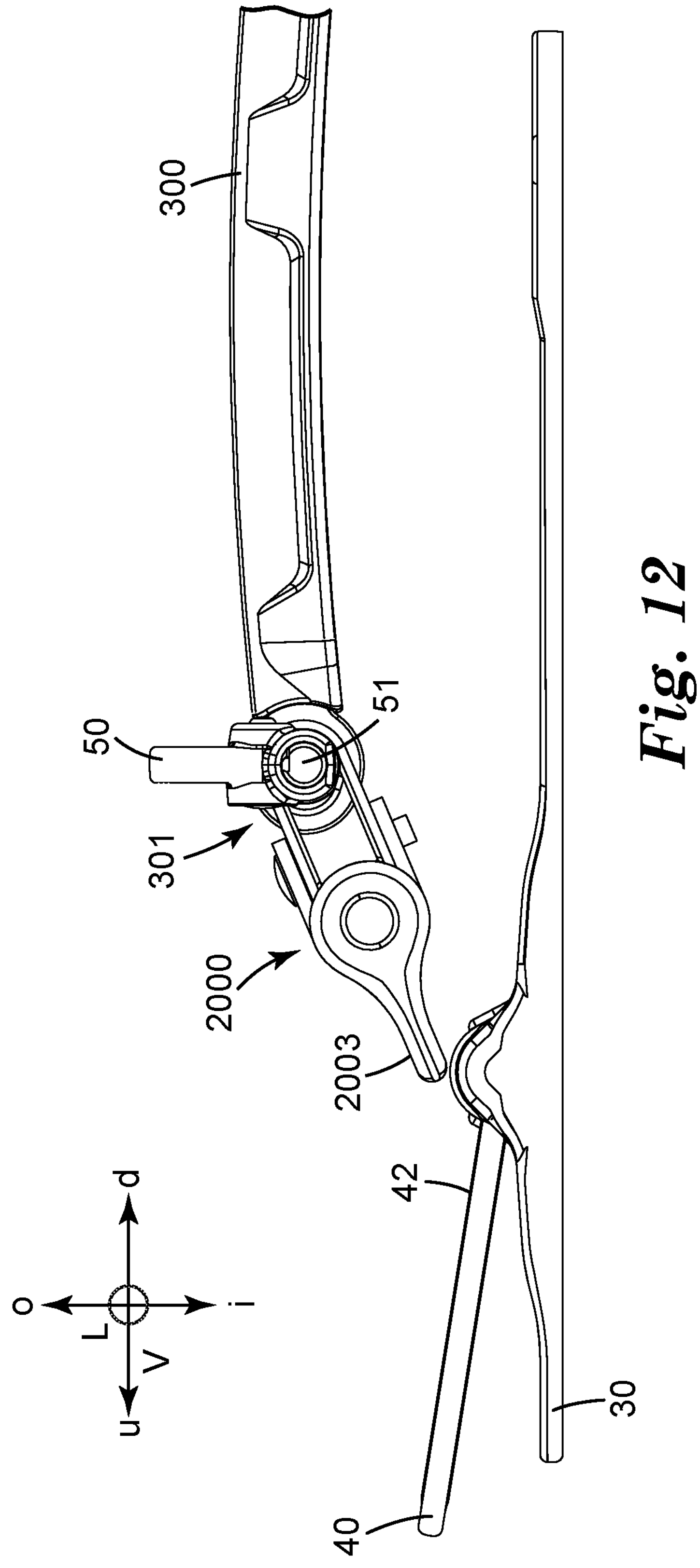
FIG. 12 is a side view, looking along the lateral direction, of the force-transfer member and other items of FIG. 11.
Figure 13:
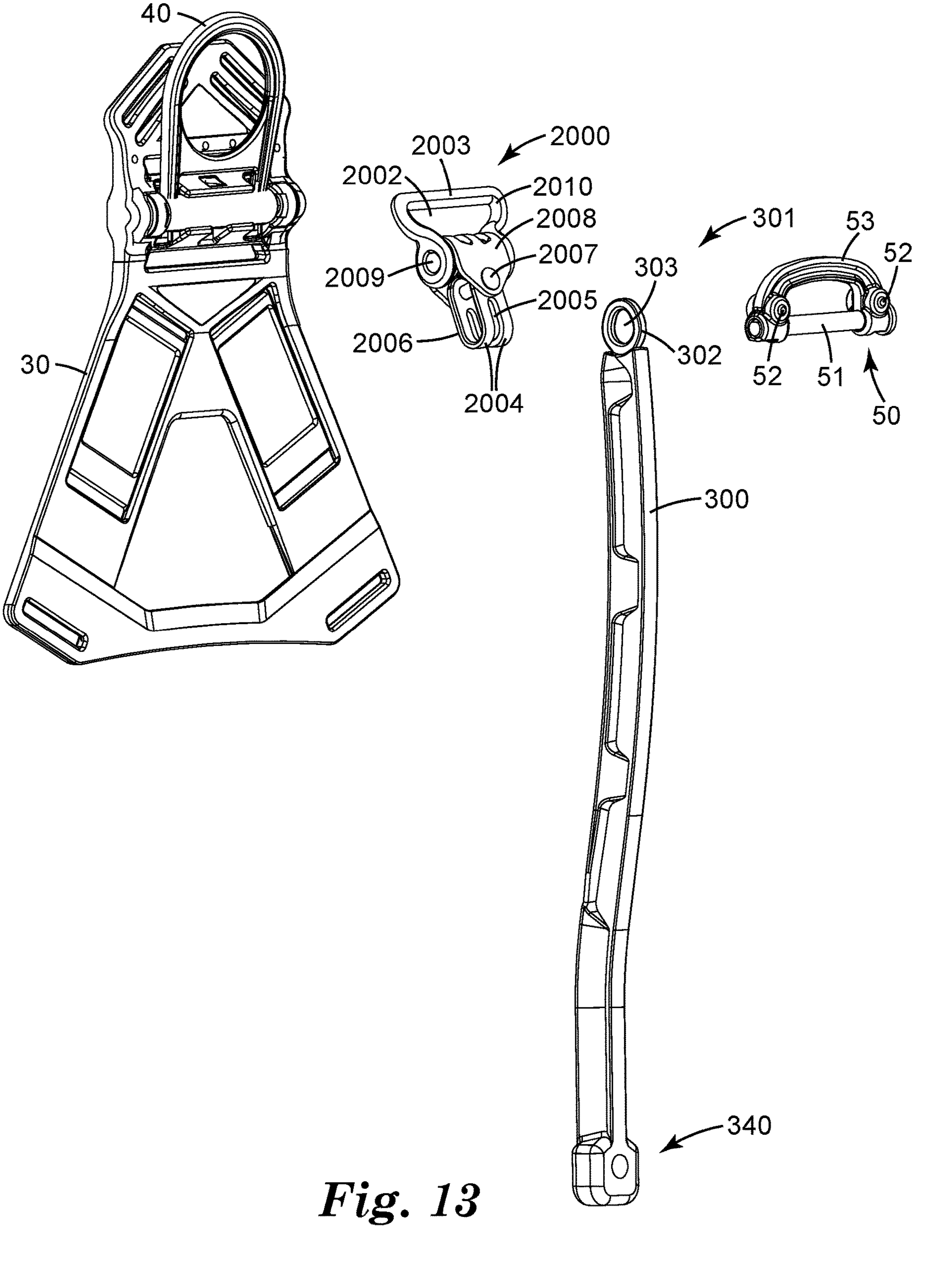
FIG. 13 is a side-rear partially exploded perspective view of the force-transfer member and other items of FIG. 11.
Figure 14:
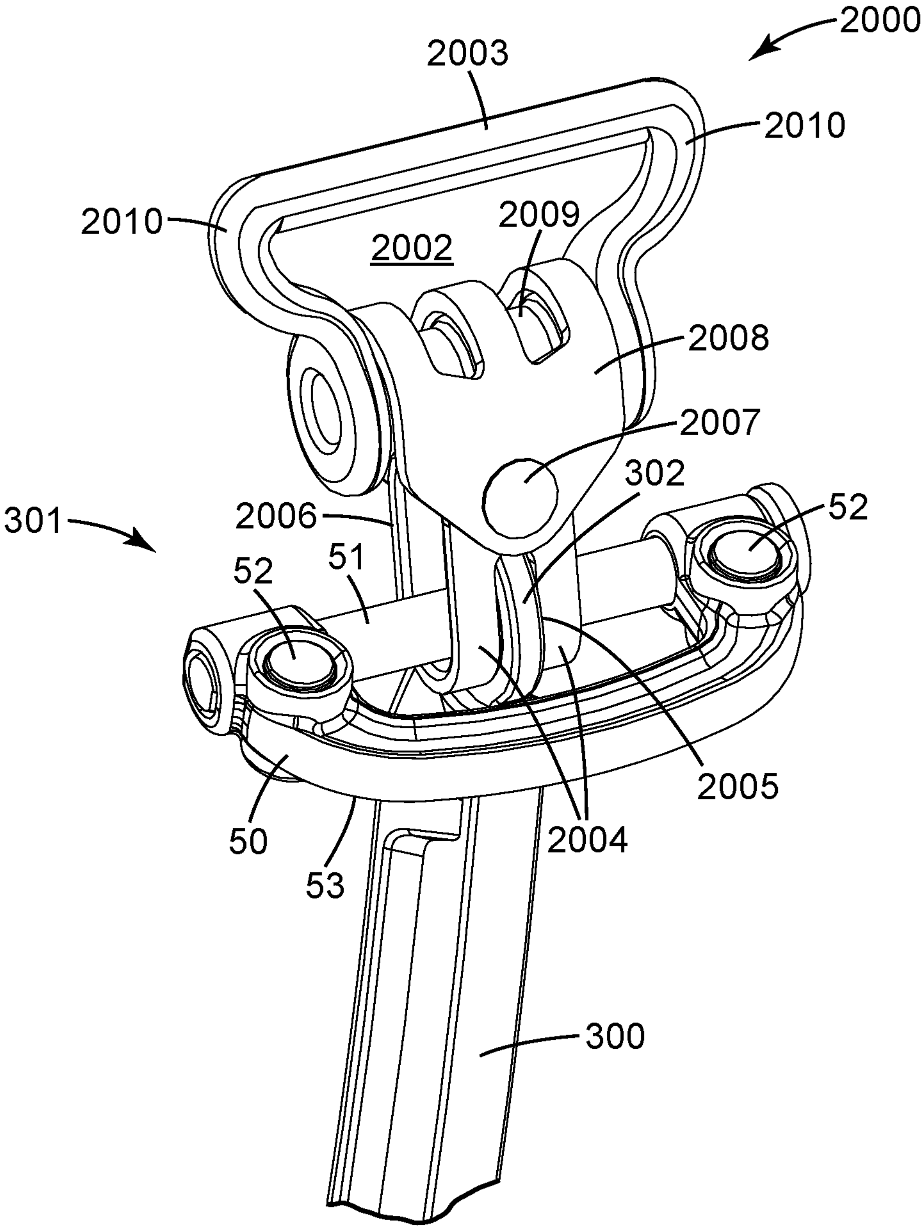
FIG. 14 is a perspective view of an upper end of an exemplary force-transfer member that is fastened to an exemplary multi-axis quick-connector by an exemplary fastener.

As seen most easily in FIGS. 9 and 10, in some exemplary embodiments mating feature 302 of force-transfer member 300 may be a tab comprising an aperture 303. Complementary mating feature 1005 of quick-connector 1000 may be a slot defined between first and second apertured flanges 1004. As shown in FIGS. 9 and 10, tab 302 can be slid into place between flanges 1004, with aperture 303 of the tab, and the apertures (unnumbered) of flanges 1004, being aligned so that a portion of an elongate (pin) fastener can be passed through the aligned apertures. FIGS. 7-9 show a conventional carabiner being used for such purposes. The isolated views of FIGS. 10A and 10B show the use of a different fastener, e.g., of the general type depicted in FIGS. 5-6, except that the fastener is now being used to fasten the force-transfer member to a quick-connector rather than to fasten the member directly to the shoulder straps. As evident from FIGS. 10A and 10B, in order to connect the force-transfer member to the quick-connector and fasten these two items together, the complementary connecting features of the force-transfer member and the quick-connector can be mated together, the closure pin 51 of fastener 50 can be momentarily retracted, the closure pin can be aligned with the apertures of the connecting features, and the pin can be closed (inserted through the apertures) and locked in place.

It will be evident from FIGS. 7-10 that in some embodiments of this type, the only significant freedom of movement that quick-connector 1000 exhibits is the ability to pivotally rotate about its base 1003 so that the outer portions of the quick-connector can move upward or downward along an arcuate path. That is, at least when the shoulder straps are snugged tight as in ordinary use of the safety harness, the quick-connector may exhibit little ability to move in a lateral direction except for perhaps some incidental movement allowed by momentary slack in the shoulder straps. This type of quick-connector will thus be designed a single-axis quick-connector.

In FIGS. 7 and 9, the lower end 340 of the force-transfer member 300 comprises a (non-permanent) connection, e.g., a pivotal connection, 341 to a waist plate 7 (in these Figures, the waist plate and connection 341 are of a slightly different type than those shown in FIGS. 3-6). Again, any suitable connection between the lower end of the force-transfer member and the waist plate is envisioned. It will also be appreciated that the complementary mating features of the upper end of the force-transfer member, and of the quick-connector, can be varied as desired. For example, the upper end of the force-transfer member could comprise flanges defining a slot therebetween (e.g., the upper end of the force-transfer member may be bifurcated), with the quick-connect comprising a tab configured to fit into the slot. In many convenient embodiments, the quick-connector may be a single, integral piece of metal, e.g., aluminum or steel.

Regardless of the exact design of the force-transfer member, quick-connector, waist plate, fastener, and so on, it will be appreciated that in such a design, the base 1003 of the quick-connector is positioned outward from base 41 of D-ring 40, and outward from dorsal plate 30 (if either or both of these components are present), as can easily be seen in FIG. 8. (Although the shoulder straps are omitted from FIGS. 7-8 it is readily apparent where such straps would be routed through the various slots in the dorsal plate, D-ring and quick-connector.) It is evident from FIG. 8 that in the absence of the shoulder straps there is no item or items that would hold the base 1003 of the quick-connector 1000 in place proximate D-ring 40 and dorsal plate 30. Thus, in such embodiments quick-connector 1000 (and thus force-transfer member 300) does not comprise a hard connection (either directly or indirectly), to the D-ring or the base plate. Rather, these items comprise only a "soft" connection to such components, i.e., by way of the shoulder straps. Furthermore, in such embodiments the base 1003 of the quick-connector 1000 is positioned outward of, and does not coincide with or define in any way, the axis of rotation 43 of the D-ring.

FIGS. 11-14 depict, in exemplary embodiment, the use of another quick-connector 2000 that is a multi-axis connector. In this case, flanges 2004 that define complementary mating slot 2005 of the quick-connector are not part of a single, rigid, integral quick-connector. Rather, flanges 2004 are portions of a swivelable piece 2006 that is (non-removably) mounted on a pin 2007. This allows piece 2006 to pivotally move about an axis of rotation that coincides with pin 2007; that is, to move along an arc in a generally lateral direction. Pin 2007 is in turn seated in a collar 2008 that is rotatably mounted on a shaft 2009. Shaft 2009 is connected to sidearms 2010 that each connect to a base 2003. These components collectively provide quick-connector 2000. In such an arrangement, up and down motion is allowed by the rotation of collar 2008 about shaft 2009 (and possibly also by rotation of the quick-connector 2000 about a rotation axis coinciding with its base 2003, depending, e.g., on how tightly the shoulder straps are snugged down onto base 2003). And, lateral, side-to-side motion is allowed by the rotation of swivelable piece 2006 about pin 2007. Thus, such a quick-connector is termed a multi-axis quick connector.

Such a multi-axis quick-connector may be used in similar manner as the above-described single-axis quick-connector (and it may rely on any suitable fastener, e.g., of the same type described above, and shown in FIGS. 13 and 14). Once again, such a connector will comprise a base that is positioned outward from base 41 of D-ring 40, and outward from dorsal plate 30 (if either or both of these components are present), as can easily be seen in FIG. 12. It is evident from FIG. 12 that in the absence of shoulder straps there is no item or items that would hold the base 2003 of the quick-connector 2000 in place proximate D-ring 40 and dorsal plate 30. Thus, in such embodiments quick-connector 2000 (and thus force-transfer member 300) does not comprise a hard connection (either directly or indirectly) to the D-ring or the base plate. Rather, these items comprise only a "soft" connection to such components, i.e., by way of the shoulder straps. Furthermore, the base 2003 of the quick-connector 2000 is positioned outward of, and does not coincide with or define in any way, the axis of rotation 43 of the D-ring.

Further details of multi-axis quick-connectors of the general type described herein (in the absence of a force-transfer member as disclosed herein) are presented in U.S. Pat. No. 10,232,199, which is incorporated by reference in its entirety herein.

In some particular embodiments, a quick-connector may comprise a base that shares an axis of rotation with a D-ring. In such embodiments, the base of the quick-connector may be coaxially mounted on a base of the D-ring; or, a base of the D-ring may serve as the base of the quick-connector. Arrangements of this general type (in the absence of a force-transfer member as disclosed herein) are described in the above-cited '199 U.S. Patent.

In some embodiments, one or more fall-protection items such as one or more self-retracting lifelines (SRLs) may be attached to the safety harness. In some embodiments, such an item or items may be attached to a D-ring, e.g., a dorsal D-ring, that is present on the harness. In some embodiments such an item or items may be mounted on a fastener such as the above-described fastener 50. (Any such arrangement may be particularly useful if a force-transfer member is connected to a quick-connect that might otherwise be used to connect an SRL or other item to the harness.) Such an SRL or other item may be provided with any suitable component (e.g., a ring (203) of the general type described in the '199 U.S. Patent) to facilitate such arrangements.

As noted, any suitable fastener (e.g., a so-called harness interface connector) may be used to fasten a force-transfer member to shoulder straps at a dorsal crossing point, or to fasten a force-transfer member to a quick-connector that is mounted on shoulder straps at a dorsal crossing point. If the fastener is also used to facilitate the attaching of multiple items (e.g., two "personal" SRLs) to the safety harness, the fastener may comprise a design that enhances such an ability. Various fasteners that may be suitable for such purposes are described for example in U.S. Pat. No. 9,174,073.

If desired, a force-transfer member (whether attached directly to shoulder straps, or to a quick-connect) may be vertically adjustable. In some embodiments, this may be achieved by allowing the member to have an adjustable elongate length, e.g., by making it from first and second telescoping members that comprise an actuator (e.g., a spring-biased push-button) that allow the members to be moved relative to each other and then locked into a desired position. In some embodiments (in which the length of the member may or may not be adjustable), but the waist plate may be provided with several vertically spaced connecting points to which the lower end of the member can be connected (waist plate 340 of FIG. 11 comprises such functionality, although not shown in detail).

LIST OF EXEMPLARY EMBODIMENTS

Embodiment 1 is a fall-protection safety harness, comprising: first and second shoulder straps that overlap and cross at a dorsal crossing point; a waist strap; and, a rigid dorsal force-transfer member with an upper end that is removably connected to the first and second shoulder straps at the dorsal crossing point of the first and second shoulder straps and with a lower end that is removably connected to a dorsal portion of the waist strap.

Embodiment 2 is the safety harness of embodiment 1 wherein the upper end of the dorsal force-transfer member is directly and removably connected to the first and second shoulder straps by way of portions of at least partially overlapping sections of the first and second shoulder straps passing through a bounded slot provided at the upper end of the dorsal force-transfer member.

Embodiment 3 is the safety harness of embodiment 2 wherein the bounded slot that is provided at the upper end of the dorsal force-transfer member, is defined in part by a base that portions of the at least partially overlapping sections of the first and second shoulder straps pass outwardly of, the base comprising first and second laterally-spaced sleeves that define an access gap therebetween, and comprising an elongate closure pin of a fastener, which closure pin fills the access gap so that the slot is bounded.

Embodiment 4 is the safety harness of embodiment 1 wherein the upper end of the dorsal force-transfer member is indirectly removably connected to the first and second shoulder straps by a quick-connector that is directly, and non-removably, connected to the first and second shoulder straps, and wherein the upper end of the dorsal force-transfer member is removably connected to the quick-connector by way of at least one connecting feature of the upper end of the dorsal force-transfer member, which at least one connecting feature is mated with, and fastened to, at least one complementary connecting feature of the quick-connector.

Embodiment 5 is the safety harness of embodiment 4 wherein the at least one connecting feature of the upper end of the dorsal force-transfer member comprises a tab, and wherein the at least one complementary connecting feature of the quick-connector comprises a slot into which the tab is mated.

Embodiment 6 is the safety harness of any of embodiments 4-5 wherein the at least one connecting feature of the upper end of the dorsal force-transfer member is fastened to the at least one complementary connecting feature of the quick-connector, by a fastener that comprises an elongate closure pin that passes through at least one aperture of the at least one connecting feature of the upper end of the dorsal force-transfer member and that passes through at least one aperture of the at least one complementary connecting feature of the quick-connector.

Embodiment 7 is the safety harness of embodiment 6 further comprising at least one self-retracting lifeline that is connected to the harness by being coupled to the fastener.

Embodiment 8 is the safety harness of any of embodiments 4-7 wherein the quick-connector is a rigid connector that is directly and non-removably connected to the first and second shoulder straps by way of portions of at least partially overlapping sections of the first and second shoulder straps passing through a bounded slot of the quick-connector, and wherein the bounded slot of the quick-connector is defined in part by a quick-connector base that the portions of the at least partially overlapping sections of the first and second shoulder straps pass outwardly of.

Embodiment 9 is the safety harness of embodiment 8 wherein the safety harness comprises a dorsal D-ring that is connected to the first and second shoulder straps at a location proximate the dorsal crossing point, and wherein the quick-connector base that the portions of the at least partially overlapping sections of the first and second shoulder straps pass outwardly of is positioned outwardly from a base of the D-ring, with the proviso that the quick-connector base does not serve as a base of, nor define an axis of rotation of, the D-ring.

Embodiment 10 is the safety harness of any of embodiments 8-9 wherein the quick-connector is a single, integral piece with the base of the quick-connector being an integral portion of the single, integral quick-connector.

Embodiment 11 is the safety harness of any of embodiments 8-10 wherein the safety harness comprises a dorsal D-ring that is connected to the first and second shoulder straps at a location proximate the dorsal crossing point, and wherein the quick-connector base that the overlapping sections of the first and second shoulder straps pass outwardly of, is a laterally-extending shaft that also serves as a base of, and defines an axis of rotation of, the D-ring.

Embodiment 12 is the safety harness of any of embodiments 4-11 wherein the quick-connector is a single-axis quick-connector.

Embodiment 13 is the safety harness of any of embodiments 4-11 wherein the quick-connector is a multi-axis quick-connector.

Embodiment 14 is the safety harness of any of embodiments 1-13 wherein the safety harness comprises a dorsal plate located at least at the dorsal crossing point of the first and second shoulder straps and that is mounted on the first and second shoulder straps.

Embodiment 15 is the safety harness of embodiment 14 with the proviso that the dorsal force-transfer member is directly and removably connected to the first and second shoulder straps rather than being directly connected to the dorsal plate.

Embodiment 16 is the safety harness of embodiment 14 with the proviso that the dorsal force-transfer member is connected to a quick-connector that is directly and non-removably connected to the first and second shoulder straps rather than being directly connected to the dorsal plate.

Embodiment 17 is the safety harness of any of embodiments 1-16 wherein the lower end of the dorsal force-transfer member is indirectly and removably connected to the dorsal portion of the waist strap by way of being directly, removably connected to a dorsal portion of a waist plate that is mounted on the waist strap.

Embodiment 18 is the safety harness of embodiment 17 wherein the lower end of the dorsal force-transfer member is pivotally connected to the waist plate so that the dorsal force-transfer member is pivotally movable at least in first and second, opposing lateral directions, through an angle of up to 30 degrees to each side of a sagittal plane of a wearer of the safety harness.

Embodiment 19 is the safety harness of embodiment 18 wherein the pivotal connection of the lower end of the dorsal force-transfer member to the waist plate is a multi-axis pivotal connection that allows the dorsal force-transfer member to be pivotally moved in forward and rearward directions.

Embodiment 20 is a method of equipping a fall-protection safety harness with a rigid dorsal force-transfer member, the method comprising: manually removably connecting an upper end of a dorsal force-transfer member to first and second shoulder straps of the harness at a dorsal crossing point of the first and second shoulder straps; and, manually removably connecting a lower end of the dorsal force-transfer member to a dorsal portion of a waist strap of the harness.

Embodiment 21 is the method of embodiment 20 wherein the manually removably connecting of the upper end of the dorsal force-transfer member to the first and second straps of the harness at the dorsal crossing point of the first and second shoulder straps comprises manually removably connecting the upper end of the dorsal force-transfer member to a quick-connector that is a factory-installed component of the harness and that is permanently connected to the first and second straps of the harness.

Embodiment 22 is the method of any of embodiments 20-21 performed using the fall-protection safety harness of any of embodiments 1 and 4-19.

Embodiment 23 is a method of removing a rigid dorsal force-transfer member from a fall-protection safety harness, the method comprising: manually disconnecting an upper end of a dorsal force-transfer member from first and second shoulder straps of the harness at a dorsal crossing point of the first and second shoulder straps; and, manually disconnecting a lower end of the dorsal force-transfer member from a dorsal portion of a waist strap of the harness.

Embodiment 24 is the method of embodiment 23 wherein the manually disconnecting of the upper end of the dorsal force-transfer member from the first and second straps of the harness at the dorsal crossing point of the first and second shoulder straps comprises manually disconnecting the upper end of the dorsal force-transfer member from a quick-connector that is a factory-installed component of the harness and that is permanently connected to the first and second straps of the harness.

Embodiment 25 is the method of any of embodiments 23-24 performed using the fall-protection safety harness of any of embodiments 1 and 4-19.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A fall-protection safety harness, comprising:

first and second shoulder straps that overlap and cross at a dorsal crossing point with the first and second shoulder straps passing through slots in a dorsal plate located at the dorsal crossing point;

a waist strap; and a rigid dorsal force-transfer member with an upper end that is removably connected to the first and second shoulder straps at the dorsal crossing point of the first and second shoulder straps and with a lower end that is removably connected to a dorsal portion of the waist strap, wherein the upper end of the rigid dorsal force-transfer member is removably connected to the first and second shoulder straps such that a load placed on at least one of the first or second shoulder straps travels to reach the rigid dorsal force-transfer member without traveling through any part of the dorsal plate.

2. The safety harness of claim 1 wherein the upper end of the dorsal force-transfer member is directly and removably connected to the first and second shoulder straps by way of portions of at least partially overlapping sections of the first and second shoulder straps passing through a bounded slot provided at the upper end of the dorsal force-transfer member.

3. The safety harness of claim 2 wherein the bounded slot that is provided at the upper end of the dorsal force-transfer member, is defined in part by a base that portions of the at least partially overlapping sections of the first and second shoulder straps pass outwardly of, the base comprising first and second laterally-spaced sleeves that define an access gap therebetween, and comprising an elongate closure pin of a fastener, which closure pin fills the access gap so that the slot is bounded.

4. The safety harness of claim 1 wherein the safety harness comprises a dorsal plate located at least at the dorsal crossing point of the first and second shoulder straps and that is mounted on the first and second shoulder straps.

5. The safety harness of claim 4 with the proviso that the dorsal force-transfer member is directly and removably connected to the first and second shoulder straps rather than being directly connected to the dorsal plate.

6. The safety harness of claim 4 wherein the dorsal force-transfer member is connected to a quick-connector that is directly and non-removably connected to the first and second shoulder straps rather than being directly connected to the dorsal plate.

7. The safety harness of claim 1 wherein the lower end of the dorsal force-transfer member is indirectly and removably connected to the dorsal portion of the waist strap by way of being directly, removably connected to a dorsal portion of a waist plate that is mounted on the waist strap.

8. The safety harness of claim 7 wherein the lower end of the dorsal force-transfer member is pivotally connected to the waist plate so that the dorsal force-transfer member is pivotally movable at least in first and second, opposing lateral directions, through an angle of up to 30 degrees to each side of a sagittal plane of a wearer of the safety harness.

9. The safety harness of claim 8 wherein the pivotal connection of the lower end of the dorsal force-transfer member to the waist plate is a multi-axis pivotal connection that allows the dorsal force-transfer member to be pivotally moved in forward and rearward directions.

10. The safety harness of claim 1 wherein the upper end of the dorsal force-transfer member is indirectly removably connected to the first and second shoulder straps by a quick-connector that is directly, and non-removably, connected to the first and second shoulder straps, and wherein the upper end of the dorsal force-transfer member is removably connected to the quick-connector by way of at least one connecting feature of the upper end of the dorsal force-transfer member, which at least one connecting feature is mated with, and fastened to, at least one complementary connecting feature of the quick-connector.

11. The safety harness of claim 10 wherein the at least one connecting feature of the upper end of the dorsal force-transfer member comprises a tab, and wherein the at least one complementary connecting feature of the quick-connector comprises a slot into which the tab is mated.

12. The safety harness of claim 10 wherein the at least one connecting feature of the upper end of the dorsal force-transfer member is fastened to the at least one complementary connecting feature of the quick-connector, by a fastener that comprises an elongate closure pin that passes through at least one aperture of the at least one connecting feature of the upper end of the dorsal force-transfer member and that passes through at least one aperture of the at least one complementary connecting feature of the quick-connector.

13. The safety harness of claim 10 wherein the quick-connector is a single-axis quick-connector.

14. The safety harness of claim 10 wherein the quick-connector is a multi-axis quick-connector.

15. The safety harness of claim 10 wherein the quick-connector is a rigid connector that is directly and non-removably connected to the first and second shoulder straps by way of portions of at least partially overlapping sections of the first and second shoulder straps passing through a bounded slot of the quick-connector, and wherein the bounded slot of the quick-connector is defined in part by a quick-connector base that the portions of the at least partially overlapping sections of the first and second shoulder straps pass outwardly of.

16. The safety harness of claim 15 wherein the safety harness comprises a dorsal D-ring that is connected to the first and second shoulder straps at a location proximate the dorsal crossing point, and wherein the quick-connector base that the portions of the at least partially overlapping sections of the first and second shoulder straps pass outwardly of is positioned outwardly from a base of the D-ring, but the quick-connector base does not serve as a base of, nor define an axis of rotation of, the D-ring.

17. The safety harness of claim 15 wherein the quick-connector is a single, integral piece with the base of the quick-connector being an integral portion of the single, integral quick-connector.

18. The safety harness of claim 15 wherein the safety harness comprises a dorsal D-ring that is connected to the first and second shoulder straps at a location proximate the dorsal crossing point, and wherein the quick-connector base that the overlapping sections of the first and second shoulder straps pass outwardly of, is a laterally-extending shaft that also serves as a base of, and defines an axis of rotation of, the D-ring.

19. A method of equipping a fall-protection safety harness with a rigid dorsal force-transfer member, the method comprising:

providing the safety harness of claim 1;

manually removably connecting the upper end of the dorsal force-transfer member to the first and second shoulder straps of the harness at the dorsal crossing point of the first and second shoulder straps; and manually removably connecting the lower end of the dorsal force-transfer member to the dorsal portion of the waist strap of the harness.

20. A method of removing a rigid dorsal force-transfer member from a fall-protection safety harness, the method comprising:

providing the safety harness of claim 1;

manually disconnecting the upper end of the dorsal force-transfer member from the first and second shoulder straps of the harness at the dorsal crossing point of the first and second shoulder straps; and manually disconnecting the lower end of the dorsal force-transfer member from the dorsal portion of the waist strap of the harness.

* * * * *